(12) United States Patent
Li et al.

(10) Patent No.: US 12,184,217 B2
(45) Date of Patent: Dec. 31, 2024

(54) SYSTEM AND METHOD FOR VARIABLE DC BUS VOLTAGE COUPLED TO INVERTERS

(71) Applicant: Deere & Company, Moline, IL (US)

(72) Inventors: Dan Li, Fargo, ND (US); Long Wu, Fargo, ND (US); Guangqi Zhu, Menomonee Falls, WI (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 17/806,606

(22) Filed: Jun. 13, 2022

(65) Prior Publication Data

US 2022/0302851 A1    Sep. 22, 2022

Related U.S. Application Data

(63) Continuation of application No. 16/653,016, filed on Oct. 15, 2019, now Pat. No. 11,418,130.

(Continued)

(51) Int. Cl.
*H02H 3/16* (2006.01)
*H02H 7/06* (2006.01)
(Continued)

(52) U.S. Cl.
CPC .............. *H02P 5/74* (2013.01); *H02M 1/143* (2013.01); *H02M 7/4826* (2013.01); *H02M 7/493* (2013.01); *H02P 6/28* (2016.02); *H02M 1/0006* (2021.05); *H02M 1/0043* (2021.05); *H02M 1/008* (2021.05)

(58) Field of Classification Search
CPC ...................................... H02P 9/10; H02P 6/16
See application file for complete search history.

(56) References Cited

U.S. PATENT DOCUMENTS 9,118,259 B2    8/2015  Ye
2007/0200529 A1*  8/2007  Kaneko ................... B60L 50/61
                                                    318/801
(Continued)

OTHER PUBLICATIONS

F. Krismer et al., Modeling and Optimization of Bidirectional Dual Active Bridge DC-DC Converter Topologies, pp. 1-69, [online], retrieved from internet <URL: https://www.pes-publications.ee.ethz.ch/uploads/tx_ethpublications/Krismer_2011_03_17_Modeling_and_Optimization_of_Bidirectional_Dual_Active_Bridge_DC-DC_Converter_Topologies.pdf>.

(Continued)

*Primary Examiner* — Kawing Chan
*Assistant Examiner* — Charles S Laughlin (57) ABSTRACT

A voltage command estimator is configured to estimate a minimum required variable DC bus voltage based on the first direct-axis current/voltage command, the first quadrature-axis current/voltage command, the second direct-axis current/voltage command, and the second quadrature-axis current/voltage command for a respective time interval. The voltage command estimator is configured to provide the estimated minimum required variable DC bus voltage to a voltage regulator to adjust the observed voltage level of the variable DC voltage bus to the estimated minimum required variable DC bus voltage to maintain the operation, as commanded by the voltage/current commands, of the first electric machine under the first variable load and the second electric machine under the second variable load at the time interval.

19 Claims, 8 Drawing Sheets

Related U.S. Application Data (60) Provisional application No. 62/861,792, filed on Jun. 14, 2019.

(51) Int. Cl.
*H02M 1/14* (2006.01)
*H02M 7/48* (2007.01)
*H02M 7/493* (2007.01)
*H02P 5/74* (2006.01)
*H02P 6/28* (2016.01)
*H02M 1/00* (2006.01)

(56) References Cited

U.S. PATENT DOCUMENTS

| | | |
|---|---|---|
| 2013/0002174 A1 | 1/2013 | Okamura et al. |
| 2014/0334189 A1 | 11/2014 | Yan et al. |
| 2016/0052505 A1 | 2/2016 | Zhou |
| 2016/0197473 A1* | 7/2016 | Zare .................... H02M 1/4216 363/35 |
| 2017/0264232 A1 | 9/2017 | Iezawa et al. |
| 2017/0353135 A1 | 12/2017 | Dutta et al. |
| 2018/0145621 A1* | 5/2018 | Aliprantis ............... H02P 21/06 |

OTHER PUBLICATIONS

M. H. Kheraluwala et al., Performance characterization of a high-power dual active bridge DC- to-DC converter, IEEE Transactions on Industry Applications, Dec. 1992, pp. 1294-1301, vol. 28, No. 6.

R. L. Steigerwald et al., A comparison of high-power DC-DC soft-switched converter topologies, IEEE Transactions on Industry Applications, Oct. 1996, pp. 1139-1145, vol. 32, No. 5.

R. W. A. A. De Doncker et al., A three-phase soft-switched high-power-density DC/DC converter for high-power applications, IEEE Transactions on Industry Applications, Feb. 1991, pp. 63-73, vol. 27, No. 1.

Iyer et al., Optimal Design Methodology for Dual Active Bridge Converter under Wide Voltage Variation, pp. 413-420.

* cited by examiner

SYSTEM AND METHOD FOR VARIABLE DC BUS VOLTAGE COUPLED TO INVERTERS

RELATED APPLICATIONS

This is a continuation of U.S. application Ser. No. 16/653,016, filed Oct. 15, 2019, which claimed priority to or the benefit of U.S. provisional application No. 62/861,792, filed Jun. 14, 2019, where the above applications are hereby incorporated by reference herein.

FIELD

This disclosure relates to a system and method for variable direct current (DC) bus voltage coupled to inverters.

RELATED APPLICATION

This application claims the benefit of the filing date of and priority to U.S. Provisional Application Ser. No. 62/861,792, filed Jun. 14, 2019, which is incorporated herein by reference in its entirety.

BACKGROUND

In some prior art vehicle systems, the DC bus voltage is fixed at a voltage level that can determine the available alternating current (AC) output of an inverter to provide an electric motor or other load. If the DC bus voltage level is designed at a higher level than required, the capacitor that is coupled to the DC bus and the switches of the inverter may experience increased thermal stress; hence, reduced longevity. Therefore, there is need for a system and method for variable DC bus voltage coupled to inverters, where the system and method is well suited for reducing thermal stress of the DC bus capacitor or the switches within one or more inverters.

SUMMARY

In accordance with one embodiment, a method and system is configured to control a first inverter and a second inverter that are coupled to variable DC voltage bus. The inverter inputs of the first and second inverters are coupled to a variable direct current (DC) voltage bus and the inverter outputs are connected to a first variable load and a second variable load. A sensor (e.g., voltage sensor) measures an observed voltage level of the variable DC voltage bus for a time interval. In a first inverter, a first electronic data processor is configured to determine a first torque command and/or first speed command comprising a first direct-axis current/voltage command and a first quadrature-axis current/voltage command based on the first variable load of a first electric machine. In a second inverter, a second electronic data processor is configured to determine a second torque command and/or second speed command comprising a second direct-axis current/voltage command and a second quadrature-axis current/voltage command based on the second variable load of a second electric machine.

A voltage command estimator is configured to estimate a minimum required (e.g., target) variable DC bus voltage based on the first direct-axis current/voltage command, the first quadrature-axis current/voltage command, the second direct-axis current/voltage command, and the second quadrature-axis current/voltage command for a respective time interval. The voltage command estimator is configured to provide the estimated minimum required variable DC bus voltage (e.g., command estimator determines a greater of the variable DC bus voltage required by a first variable load of the first machine or the second variable load of a second machine) to a voltage regulator to adjust the observed voltage level of the variable DC voltage bus to the estimated minimum required (e.g., target) variable DC bus voltage to maintain the operation, as commanded by the voltage/current commands, of the first electric machine under the first variable load and the second electric machine under the second variable load at the time interval.

DETAILED DESCRIPTION

Figure 1:
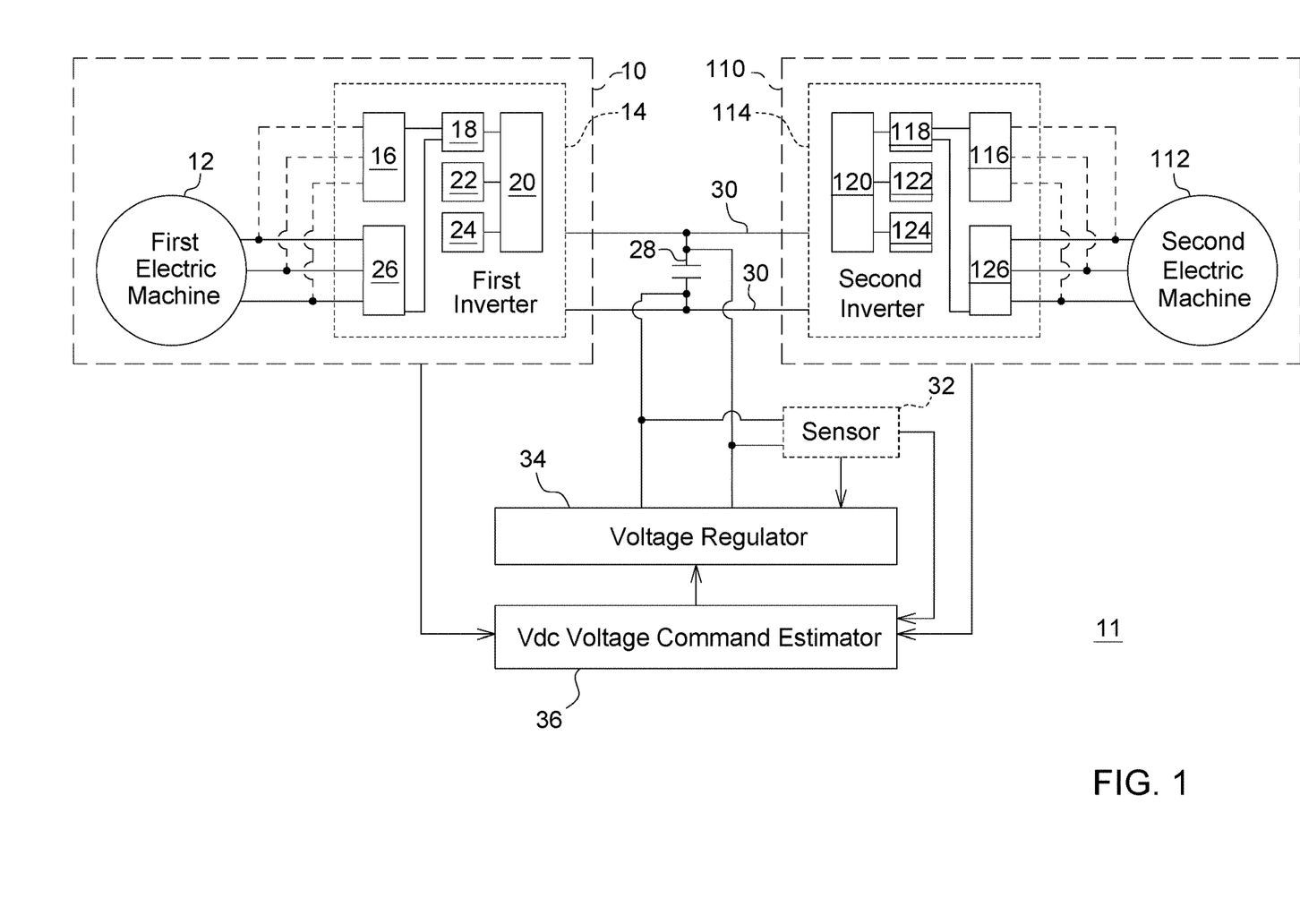
FIG. 1 is a block diagram of one embodiment of a first electric machine coupled to a first inverter that is powered by a variable DC bus, a second electric machine coupled to a second inverter that is powered by the variable DC bus, and a voltage regulator for regulating the voltage level of the variable DC bus based on command data from a command estimator.

FIG. 1 is a block diagram of one embodiment of a system 11 for variable direct current (DC) bus voltage coupled to inverters. In FIG. 1, the first electric machine 12 is coupled to a first inverter 14 that is powered by a variable DC bus (e.g., observable at DC bus terminals 30). A second electric machine 112 is coupled to a second inverter 114 that is powered by the variable DC bus. In one embodiment, a voltage regulator 34 is coupled to the DC bus terminals 30. The voltage regulator 34 is configured to regulate the voltage level of the variable DC bus based on a command estimator 36 (e.g., $V_{DC}$ voltage command estimator).

In accordance with one embodiment, a method and system 11 is configured to control a first inverter 14 and a second inverter 114 that are coupled to a variable DC voltage bus or DC bus terminals 30. The inverter inputs of the first inverter 14 and second inverter 114 are coupled to a variable direct current (DC) voltage bus at DC bus terminals 30 and the inverter outputs are connected to a first variable load (e.g., first electric machine 12) and a second variable load (e.g., second electric machine 112). A sensor 32 (e.g., voltage sensor) measures an observed voltage level of the variable DC voltage bus at the DC bus terminals 30 for a time interval. In a first inverter 14, a first electronic data processor 24 is configured to determine a first torque command and/or first speed command comprising a first direct-axis current/voltage command and a first quadrature-axis current/voltage command based on the first variable load of a first electric machine 12. In a second inverter 114, a second electronic data processor 124 is configured to determine a second torque command and/or second speed command comprising a second direct-axis current/voltage command and a second quadrature-axis current/voltage command based on the second variable load of a second electric machine 112.

In one configuration, the first inverter 14 operates to control the first electric machine 12 in one or more of the following modes: voltage control mode, a torque control mode, a sensorless position mode, a phase shift control mode, a triangular waveform control mode, a trapezoidal waveform control mode, or a space-vector-pulse-width-modulation control mode. For example, in one illustrative configuration, the first inverter 14 operates or controls the first electric machine 12 in the voltage control mode, whereas the second inverter 114 operates or controls the second electric machine 112 in the torque control mode.

A sensorless position mode means that the electric motor is not associated with an encoder, resolver or magnetic field sensor and a magnet embedded in a rotor shaft of the electric motor to estimate rotor position, rotor rotational velocity or torque of the electric motor. Instead, a machine state estimator and control module (16, 116) detects or estimates (e.g., from signal feedback from phase outputs) the rotor position, rotor velocity and/or torque of the electric machine or electric motor (12, 112).

However, in an alternate embodiment, the electric motor or electric machine may be associated with an encoder, resolver, a magnetic field sensor and a magnet embedded in a rotor shaft of the electric motor, or another machine sensor to detect or estimate rotor position, rotor rotational velocity or torque of the electric machine, where the output of the machine sensor is coupled to a respective inverter or a machine state estimator and control module (16, 116).

A voltage command estimator 36 is configured to estimate a minimum required variable DC bus voltage based on the first direct-axis current/voltage command, the first quadrature-axis current/voltage command, the second direct-axis current/voltage command, and the second quadrature-axis current/voltage command for a respective time interval. The voltage command estimator 36 is configured to provide the estimated minimum required variable DC bus voltage (e.g., command estimator determines a greater of the variable DC bus voltage required by a first variable load of the first machine or the second variable load of a second machine) to a voltage regulator 34 to adjust the observed voltage level of the variable DC voltage bus to the estimated minimum required variable DC bus voltage to maintain the operation, as commanded by the voltage/current commands, of the first electric machine 12 under the first variable load and the second electric machine 112 under the second variable load at the time interval.

In one embodiment, a first module 10 comprises a first inverter 14 coupled to a first electric machine 12, which may be controlled to operate in a primary control mode (e.g., voltage control mode) and in a power generating mode of the first electric machine 12. A second module 110 comprises a second inverter 114 coupled to second electric machine 112, which may be controlled to operate in a secondary control mode (e.g., torque control mode) and in a motoring mode of the second electric machine 112. The primary control mode may be the same as or different from the secondary control mode. In one embodiment, the first inverter 14 and the second inverter 114 may operate (e.g., optionally) with offset phases of alternating current output signals to provide interleaving that reduces the ripple current and/or ripple voltage of the variable DC bus. The first inverter 14 and the second inverter 114 have their direct current (DC) inputs coupled to the DC bus terminals 30. A capacitor 28 or a DC link capacitor 28 is connected across or in parallel with respect to the terminals of the DC bus.

A sensor 32 (e.g., voltage sensor) is coupled to the DC bus terminals 30. Further, a voltage regulator 34 is coupled to the DC bus terminals 30 and may be connected or wired in parallel with the sensor 32. The first module 10, first inverter 14, or first electronic data processor 24 provides one or more data messages to the voltage command estimator 36; the second module 110 provide, the second inverter 114, or the second electronic data processor 124 provides one or more data messages to the voltage command estimator 36. The data messages may comprise any of the following: (1) a first torque command and/or first speed command comprising a first direct-axis current/voltage command and a first quadrature-axis current/voltage command based on the first variable load of a first electric machine 12 and (2) a second torque command and/or second speed command comprising a second direct-axis current/voltage command and a second quadrature-axis current/voltage command based on the second variable load of a second electric machine 112. In turn, the voltage command estimator 36 may estimate a commanded estimated variable DC bus voltage based on the data messages received form the first module 10, the second module 110, or both.

Figure 3:
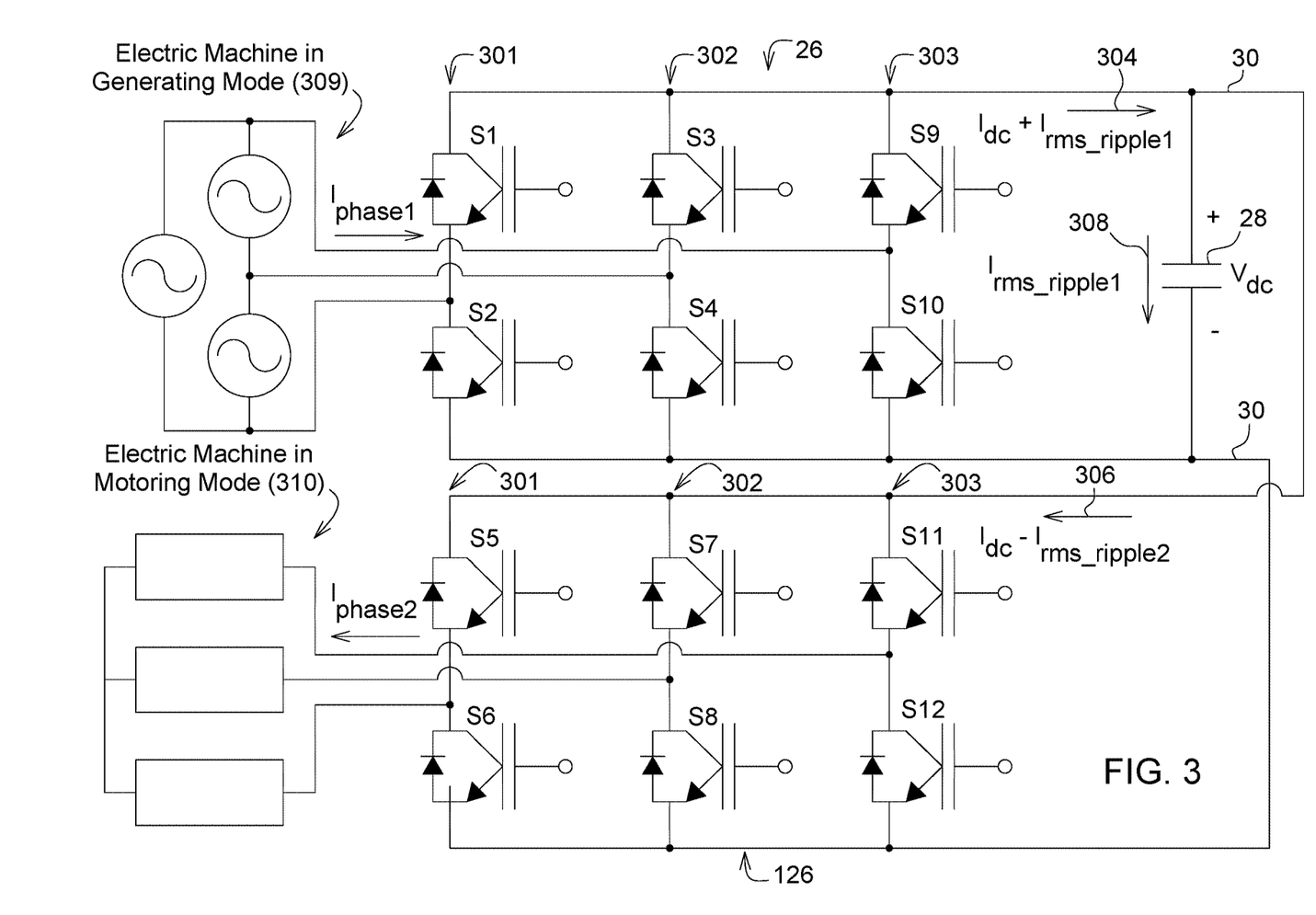
FIG. 3 is a schematic that shows an illustrative schematic of the switches of the first inverter and the second inverter that are fed by a variable DC bus with a capacitor to reduce ripple current on the variable DC bus.

The first inverter 14 comprises first inverter 14 switches that output alternating current to the first electric machine 12 in accordance with one or more phases of alternating current outputs. As illustrated in FIG. 1, there are three-phase connections between the first inverter 14 and the first electric machine 12. The first data processor 24 controls the switching states of the first inverter 14 switches in accordance with a control mode or modulation scheme via control signals that are provided via one or more data ports 18 to the control terminals (e.g., gate terminal or base terminal) of each switch, where the first inverter switches 26 are illustrated in FIG. 3 as insulated-gate bipolar junction transistors (S1 through S12, inclusive).

The first inverter 14 comprises first electronic data processor 24, a data storage device 22 and one or more data ports 18 that can communicate with each other via a data bus 20. Further, the data ports 18 are coupled to a first machine state estimator and control module 16 and the first inverter switches 26. The first machine state estimator and control module 16 is arranged to receive electrical signals from the alternating current output phases of the inverter switches 26, which the first electronic data processor 24 can use to estimate rotor position, rotor velocity, and rotor torque, among other possibilities. The transmission lines or conductors that are coupled between the first machine state estimator and control module 16 and the phase output terminals of the first inverter switches 26 are illustrated as dashed lines to indicate that the conductors are optional. Accordingly, in an alternate embodiment, the first machine state estimator and control module 16 may obtain sensor data from a machine sensor (not shown) associated with the rotor of the first electric machine 12.

The second inverter 114 comprises second inverter switches 126 that output alternating current to the second electric machine 112 in accordance with one or more phases. As illustrated in FIG. 1, there are three-phase connections between the second inverter 114 and the second electric machine 112. The second data processor 124 controls the switching states of the second inverter switches 126 in accordance with a control mode or modulation scheme via control signals that are provided via one or more data ports 118 to the control terminals (e.g., gate terminal or base terminal) of each switch, where the second inverter switches 126 are illustrated in FIG. 3 as insulated-gate bipolar junction transistors (S1 through S12, inclusive).

The second inverter 114 comprises second data processor 124, a data storage device 122 and one or more data ports 118 that can communicate with each other via a data bus 120. Further, the data ports 118 are coupled to a second machine state estimator and control module 116 and the second inverter switches 126. The second machine state estimator and control module 116 is arranged to receive electrical signals from the alternating current output phases of the inverter switches 126, which the second electronic data processor 124 can use to estimate rotor position, rotor velocity, and rotor torque, among other possibilities. The transmission lines or conductors that are coupled between the second machine state estimator and control module 216 and the phase output terminals of the second inverter 114 switches are illustrated as dashed lines to indicate that the conductors are optional. Accordingly, in an alternate embodiment, the second machine state estimator and control module 116 may obtain sensor data from a machine sensor (not shown) associated with the rotor of the second electric machine 112.

Figure 2:
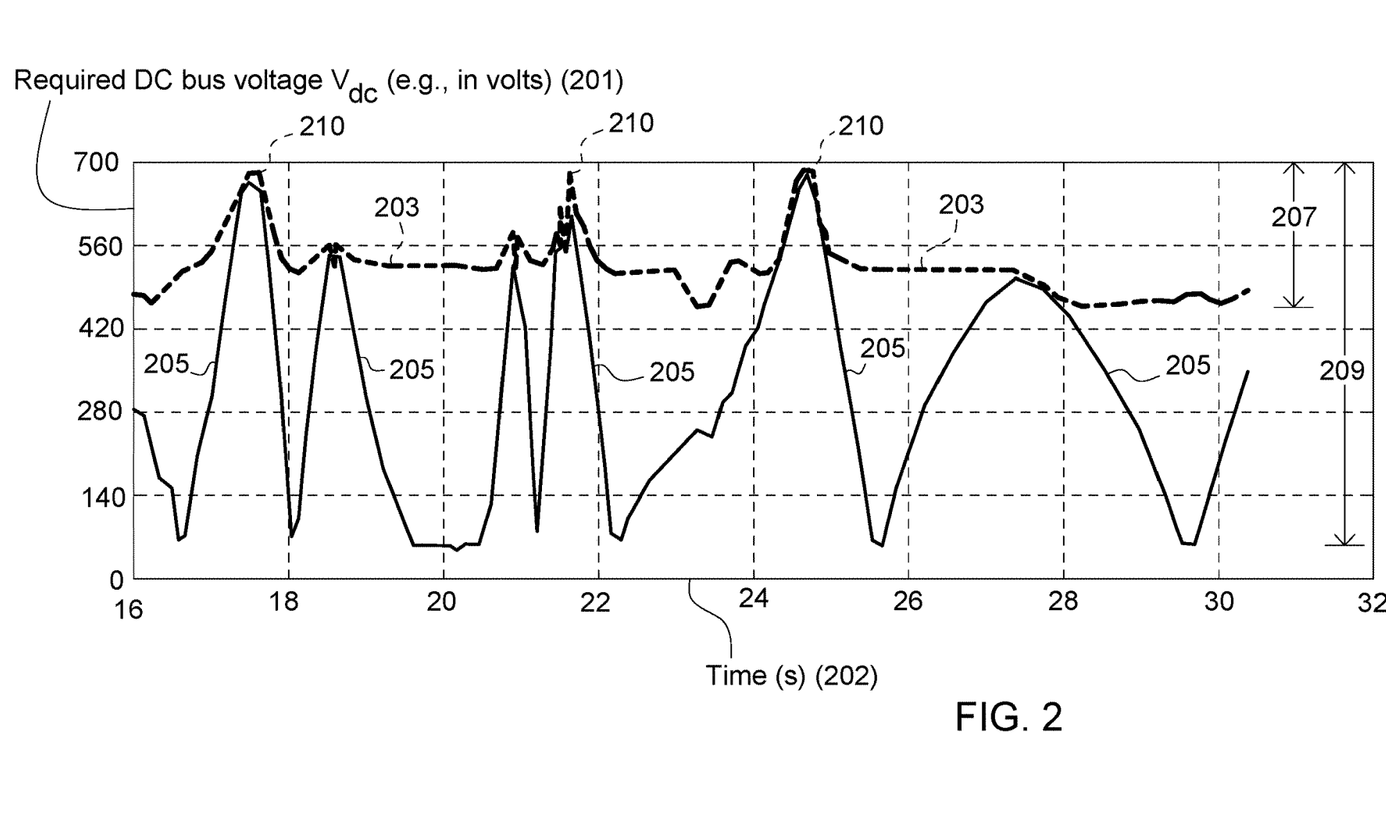
FIG. 2 is a graph that shows illustrative examples of the (minimum estimated target or) required DC bus voltage versus time under hypothetical transient loads for a first variable load and a second variable load.

FIG. 2 is a graph that shows illustrative examples of the required (e.g., target minimum estimated) variable DC bus voltage 201 versus time 202 under hypothetical transient loads. As illustrated in FIG. 2, the vertical axis represents the required DC bus voltage 201 (e.g., in Volts), whereas the horizontal axis represents the time 202 (e.g., in seconds) in response to hypothetical or modeled changes in load, or arbitrary transient load conditions for a working vehicle that incorporates the system 11 for electric motors or actuators that propel a vehicle or drive implements, associated with the work vehicle (e.g., off-road work vehicle).

In FIG. 2, the first minimum estimated variable DC bus voltage is indicated by the dashed lines 203, whereas the second minimum estimated variable DC bus voltage is indicated by solid lines 205. In accordance with one embodiment, for each time interval, the voltage command estimator 36 determines a greater or maximum of the first minimum estimated variable DC bus voltage and the second minimum estimated variable DC bus voltage to regulate the resultant target variable DC bus voltage at the DC bus terminals 30.

As illustrated in FIG. 2, the first minimum estimated variable DC bus voltage relates to the first electric machine 12 operating in a power generating mode or another operational mode; the second minimum estimated variable DC bus voltage relates to a second electric machine 112 operating in a motoring mode or another operational mode.

A first voltage deviation 207 of the first minimum estimated variable DC bus voltage is less than a second voltage deviation 209 of the second minimum estimated variable DC bus voltage. Further, a first required voltage change per unit time or first slew rate of the of first minimum estimated variable voltage DC bus is less than a second voltage change per unit time or second slew rate of the second minimum estimated variable voltage DC bus. Accordingly, the longevity of the electric machine is potentially increased by reduced machine winding insulation stress (e.g., thermal stress that may be communicated to machine bearings and/or electric motor stress) by minimizing the required voltage change per unit time or required slew rate of estimated variable DC voltage bus at DC bus terminals 30.

For example, if a first required voltage change per unit time or first slew rate of the first minimum estimated variable DC bus voltage is less than a second voltage change per unit time or second slew rate of the second minimum estimated variable DC bus voltage, the first minimum estimated variable voltage DC bus can be selected for a time interval in which it is the greater or maximum of the first minimum estimated variable DC bus voltage and the second minimum estimated variable DC bus voltage. Accordingly, in the above illustrative example the longevity of capacitor 28 (e.g., DC link capacitor 28) is potentially increased because of the above first required voltage change per unit time or first slew rate of the variable DC bus voltage is less than a second voltage change per unit time or second slew rate of the second minimum estimated variable DC bus voltage.

FIG. 3 is a schematic that shows an illustrative schematic of the switches (26, 126) of the first inverter 14 and the second inverter 114 that are fed by a variable DC bus with a capacitor 28 to reduce ripple current on the variable DC bus. The first inverter 14 and the second inverter 114 are coupled to the DC bus terminals 30. The first inverter 14 has first inverter switches 26, whereas the second inverter 114 has second inverter switches 126. As illustrated, the first inverter switches 26 have three phases, a first phase 301, a second phase 302 and a third phase 303. Similarly, the second inverter switches 126 have a first phase 301, a second phase 302, and a third phase 303. Each of the above phases has two switches with their switched terminals arranged in series between the variable DC bus terminals 30. Each phase has a low-side switch and a high-side switch.

The first inverter switches 26 and the second inverter switches 126 have control terminals such as gates or base of the switch that control the switched terminals. The data ports (18, 118) are coupled via one or more conductors to control terminals. The first data processor 24 can control the states, relative phase, activation and deactivation of the first switches via the control terminals of the first switches. Similarly, the second data processor 124 can control the states, relative phase, activation and deactivation of the of the second switches via the control terminals of the second switches. Further, the first data processor 24 and the second data processor 124 can communicate with each other (e.g., via communications line, wireless communications devices coupled to their respective data ports (18, 118) or another mechanism) to control relative phases of the first switches 26 with respect to the second switches 126 in accordance with interleaving principles to reduce unwanted ripple current and/or ripple voltage on the variable DC voltage bus.

As illustrated in FIG. 1 in conjunction FIG. 3, the first electric machine (309 or 12) may operate in the power generating mode, whereas the second electric machine (310 or 112) may operate in the machine motoring mode. The first inverter 14 switches produce a direct current output with a DC current component and an alternating current ripple component 304. Some of the alternating current ripple component 308 is filtered via the capacitor 28. The second inverter 114 accesses the filtered direct current output 306 with some of the alternating current ripple component removed, attenuated or filtered out. The filtered direct current output is used to drive the second switches 126 to provide three phase alternating current output signals to drive the second electric machine 112 in the motoring mode.

Figure 4:
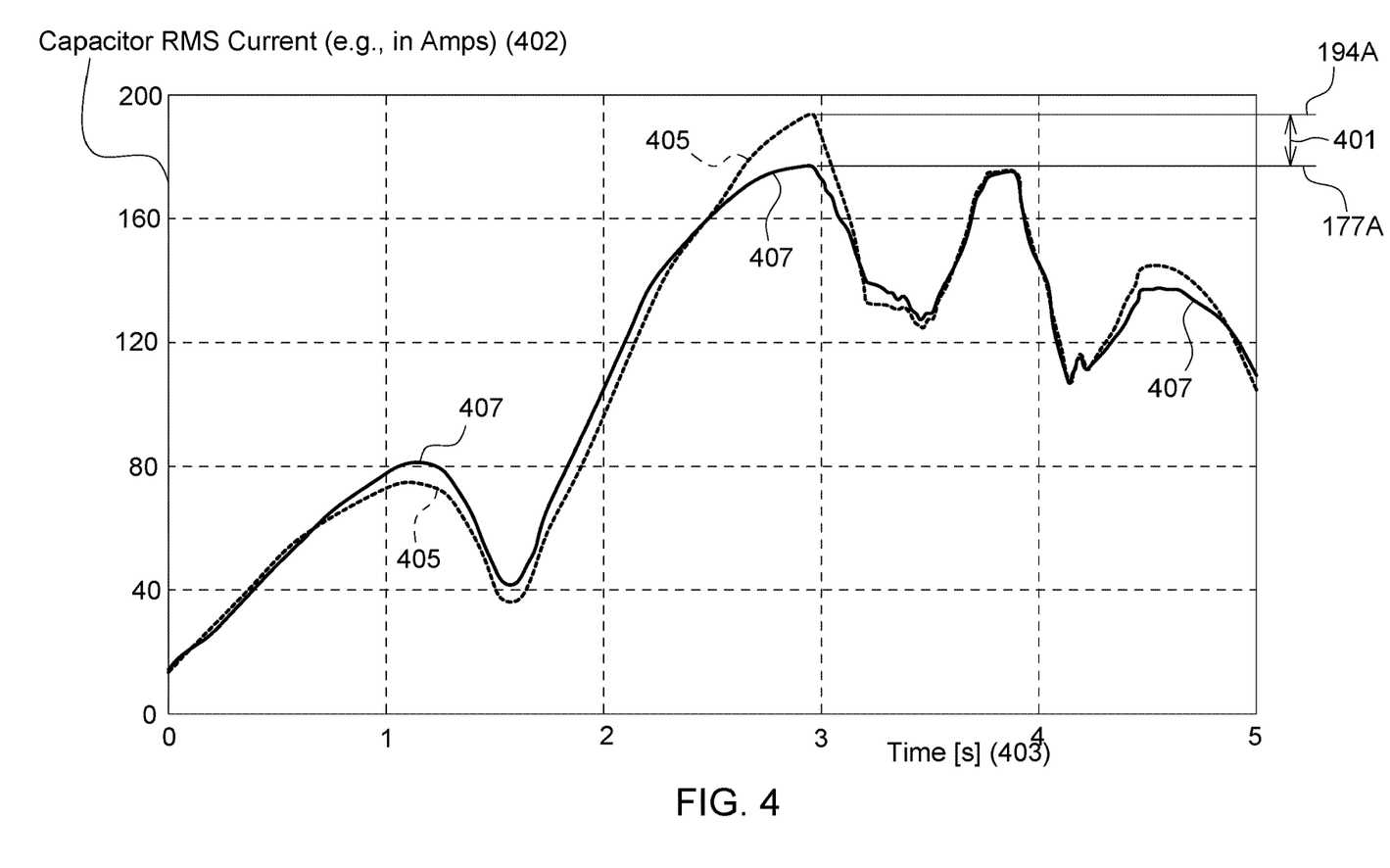
FIG. 4 is a graph that shows an illustrative decrease in the DC bus root-mean-squared (RMS) current through the capacitor, which filters out some unwanted ripple current or alternating current signal components on the variable DC bus, for the variable DC bus versus a comparable fixed DC bus.

FIG. 4 is a graph that shows the DC bus root-mean-squared (RMS) current 401 along the vertical axis and time along the horizontal axis. The current value of the variable DC voltage bus 407 is indicated by a solid line, whereas the current value of comparable fixed DC voltage bus 405 is indicated by dashed lines. FIG. 4 is a graph that shows an illustrative decrease in the DC bus root-mean-squared (RMS) current through the capacitor 28, which filters out some unwanted ripple current or alternating current signal components on the variable DC bus. In one embodiment, a capacitor 28 across the variable DC bus terminals 30 has a reduced maximum current capacity rating 401 commensurate with the reduced, peak current value of the variable DC voltage bus 407 that is lower than a peak current value of the fixed constant DC bus voltage 405. Accordingly, the reduced peak current 401 tends to reduce the required size or reduced capacitance of the capacitor 28. For example, it may be possible to reduce the capacitance that is otherwise required by approximately fifteen percent to thirty-five percent. Further, the reduced peak current supports potential improved longevity of capacitor 28 (e.g., direct current link capacitor 28) in the system.

Figure 5:
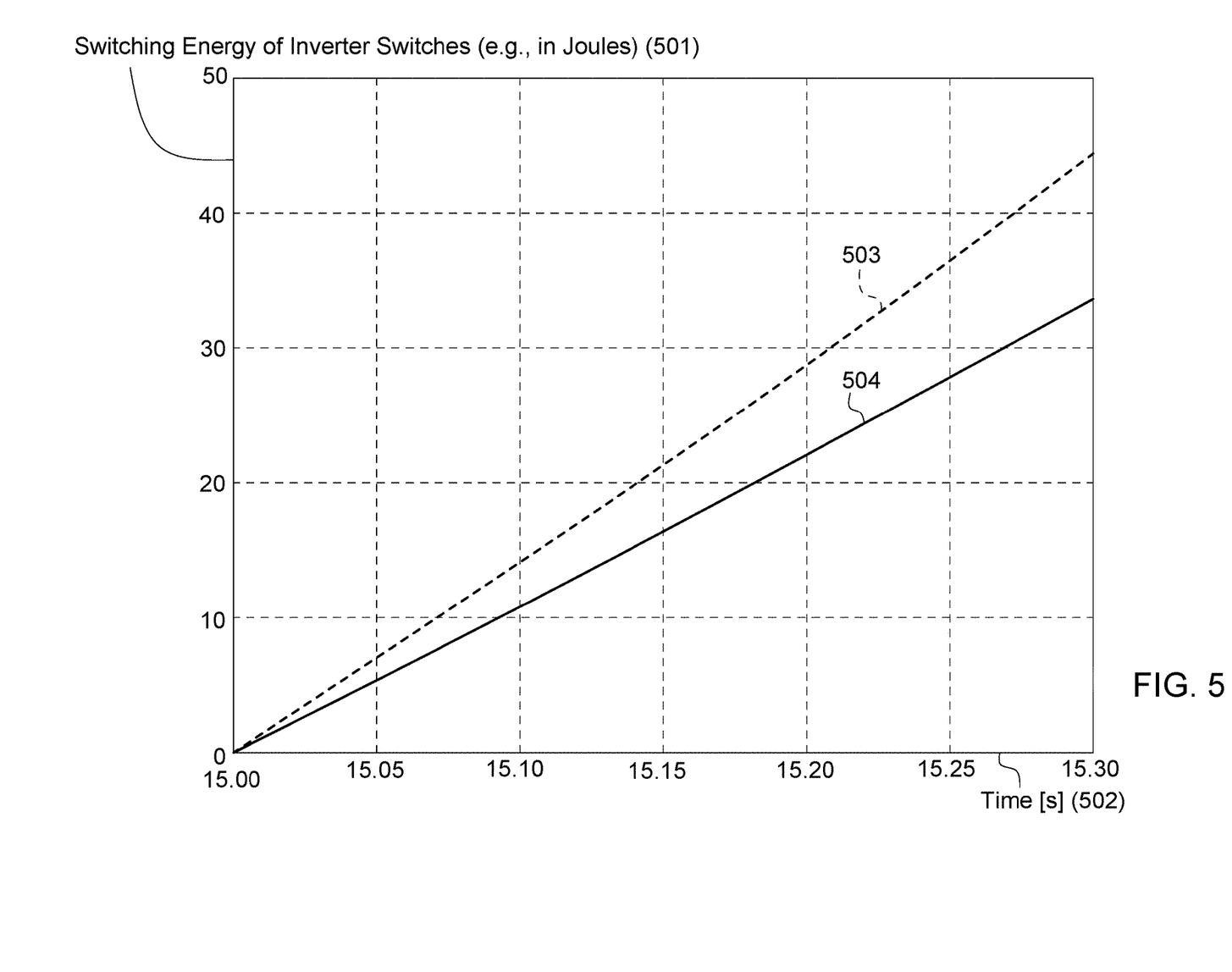
FIG. 5 is a graph that shows the switching energy versus time of inverter switches for a fixed DC bus versus a variable DC bus that meets the minimum estimated target required DC voltage level of the variable DC bus based on load conditions (e.g., transient load conditions on the electric machine that the inverter drives).

FIG. 5 is a graph that shows the switching energy 501 versus time 502 of an inverter for a fixed DC bus versus a variable DC bus that meets the minimum estimated target required DC voltage level of the variable DC bus based on load conditions (e.g., transient load conditions on the electric machine that the inverter drives). The vertical axis represents the switching energy of inverter switches (e.g., in Joules) whereas the horizontal axis represents time (e.g., in seconds). In one configuration, a set of semiconductor switches (26, 126) in the first inverter 14 and the second inverter 114 have reduced time-averaged, operational switching losses 504 associated with a reduction in the variable DC bus voltage from the operational switching losses 503 associated with a fixed constant DC bus voltage. The operational switching losses 504 associated with the variable DC bus voltage are illustrated as the solid line, whereas the operational switching losses 503 associated with the fixed constant DC bus voltage are illustrated as the dashed line. Because of the reduction in the variable DC bus voltage, a reserved component of the DC bus voltage can be available to meet responsively and rapidly in real time transient conditions of commanded torque that are demanded by load conditions on the first electric machine 12, the second electric machine 112 or both.

Figure 6:
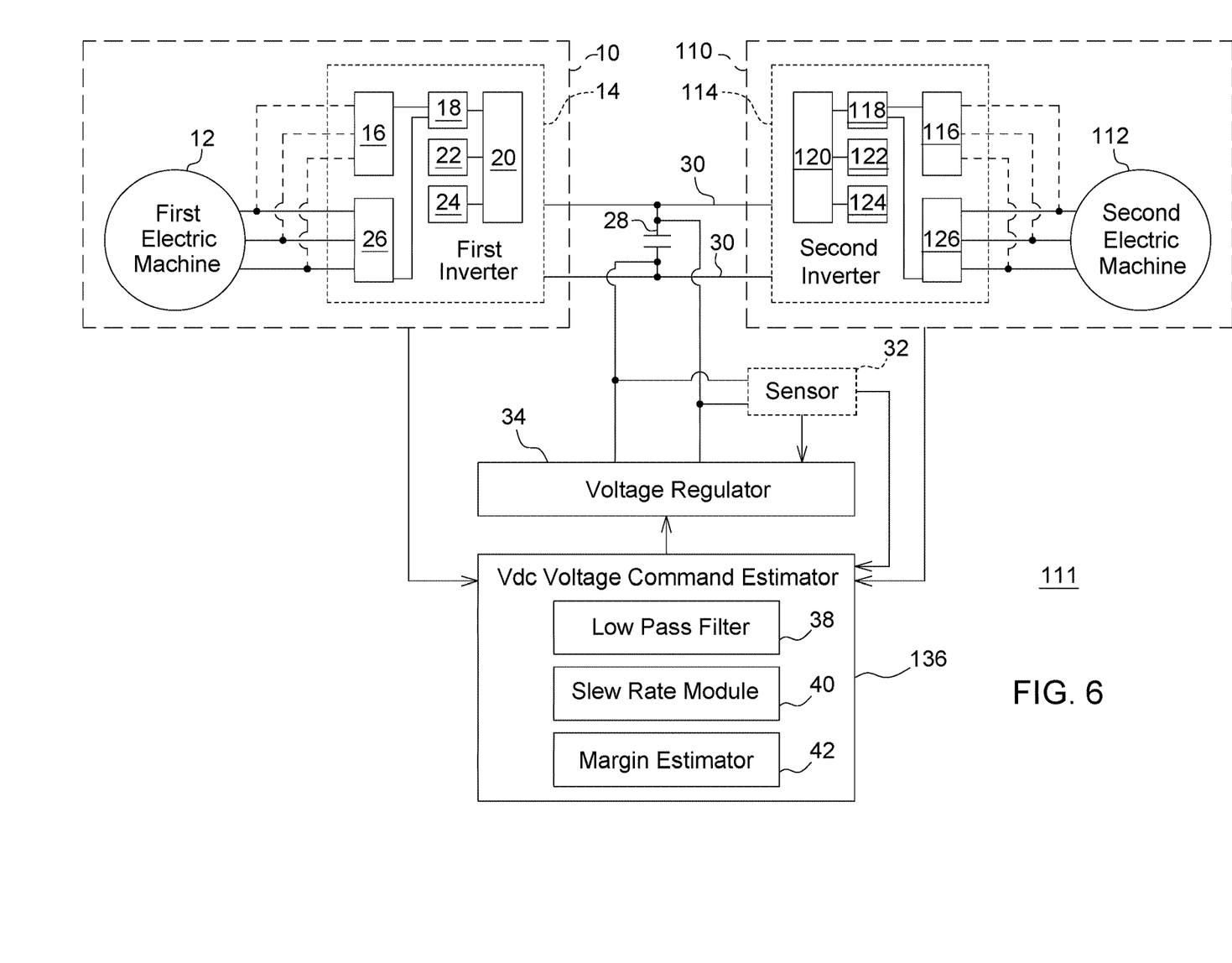
FIG. 6 is a block diagram of another embodiment of a first electric machine coupled to a first inverter that is powered by a variable DC bus, a second electric machine coupled to a second inverter that is powered by the variable DC bus, and a voltage regulator for regulating the voltage level of the variable DC bus based on command data from a command estimator with configurable filtering, slew-rate and margin.

FIG. 6 is a block diagram of another embodiment of a first electric machine 12 coupled to a first inverter 14 that is powered by a variable DC bus at DC terminals 30, a second electric machine 112 coupled to a second inverter 114 that is powered by the variable DC bus at DC terminals 30, and a voltage regulator 34 for regulating the voltage level of the variable DC bus based on a command estimator 136 with configurable filtering, configurable slew-rate and configurable margin (M). The system 111 of FIG. 6 is similar to the system 11 of FIG. 1, except the system of FIG. 6 further comprises a low pass filter 38, a slew rate module 40 and a margin estimator 42. The operation and configuration of the low pass filter 38, slew rate module 40 and margin estimator 42 are later described in conjunction with FIG. 8.

Figure 7:
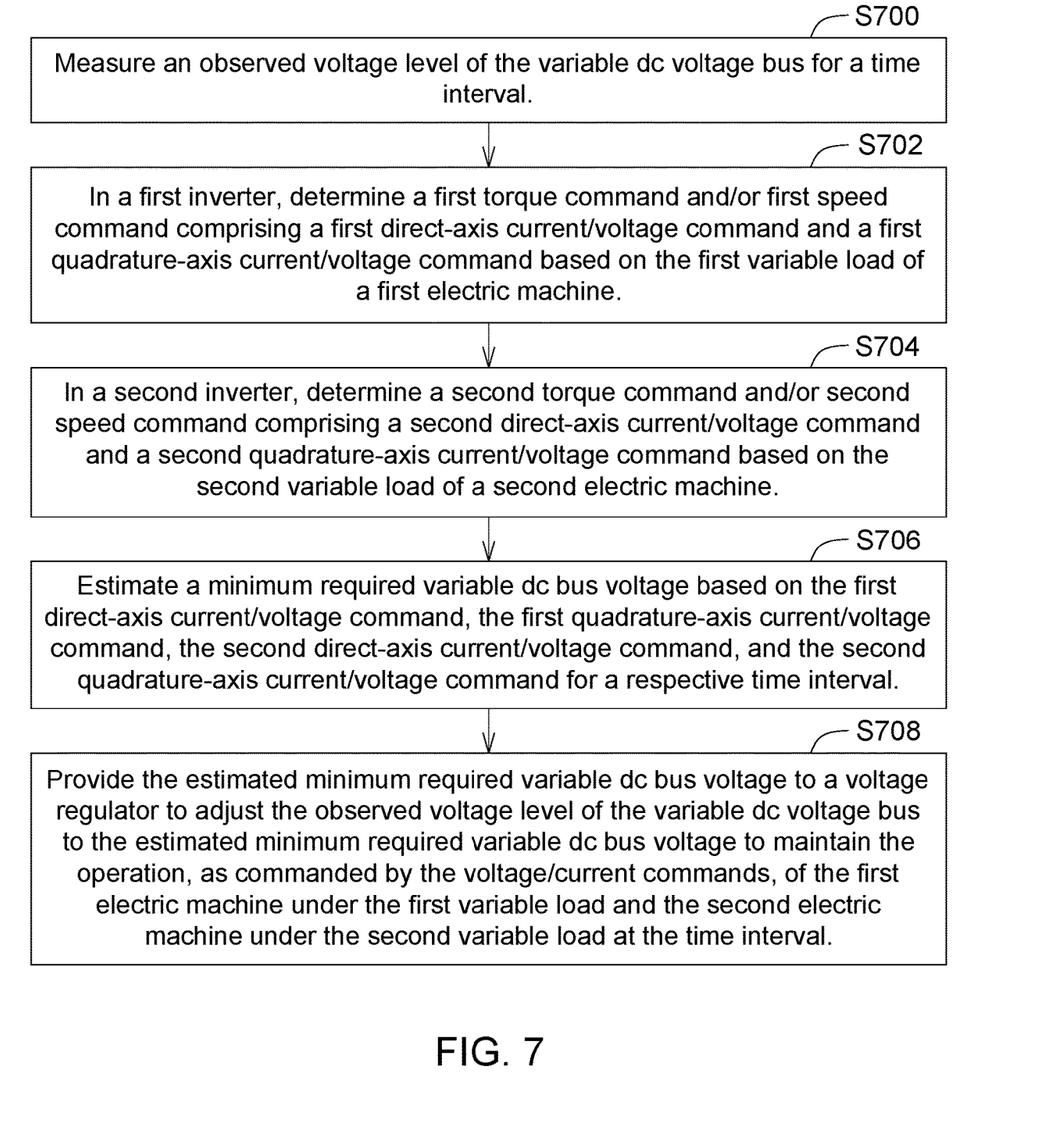
FIG. 7 is a flow chart of one embodiment of a method for providing an estimated minimum required (e.g., target) variable DC bus voltage to a regulator.

FIG. 7 is a flow chart of one embodiment of a method for providing an estimated minimum required variable DC bus voltage to a regulator 34. The method of FIG. 7 begins in step S700.

In step S700, a sensor 32 (e.g., voltage sensor) measures an observed voltage level of the variable direct current (DC) voltage bus at the DC bus terminals 30 for a time interval (e.g., a sampling interval). For example, the sensor 32 may have a high-impedance so as not to disturb or skew any voltage measurement samples across the DC bus terminals 30 that are taken at successive intervals.

In step S702 in a first inverter 14, a first data processor 24 determines a first torque command and/or first speed command comprising a first direct-axis current/voltage command and a first quadrature-axis current/voltage command based on the first variable load of a first electric machine 12.

In step S704 in a second inverter 114, a second data processor 124 determines a second torque command and/or second speed command comprising a second direct axis current/voltage command and a second quadrature axis current/voltage command based on the second variable load of a second electric machine 112.

In step S706, a voltage command estimator 36 is configured to estimate or estimates a minimum required variable DC bus voltage based on the first direct-axis current/voltage command, the first quadrature-axis current/voltage command, the second direct-axis current/voltage command and the second quadrature-axis current/voltage command for a respective time interval.

In step S708, the voltage command estimator 36 is configured to provide the estimated minimum required variable DC bus voltage to a voltage regulator 34 to adjust the observed voltage level of the variable DC voltage bus to the estimated minimum required variable DC bus voltage to maintain the operation, as commanded by the voltage/current commands, of the first electric machine 12 under the first variable load and the second electric machine 112 under the second variable load at the time interval.

Step S708 may be executed in accordance with various techniques, which may be applied separately or cumulatively.

In accordance with a first technique for execution of step S708, the voltage command estimator 36 is configured to provide the estimated minimum (e.g., target) required variable DC bus voltage, where the voltage command estimator 36 is configured to limit the fluctuation of the DC bus voltage to meet or exceed the demanded current and respective demanded voltage levels of the first electric machine 12 under the first variable load and the second electric machine 112 under the second variable load, as if the variable DC bus voltage were fixed at constant DC level above the estimated minimum required variable DC bus voltage.

In accordance with a second technique, the voltage command estimator 36 is configured to estimate the required minimum (e.g., target) variable DC bus voltage by estimating the target variable DC bus voltage to be proportional to the square root of the sum of the squares of the commanded-direct axis voltage and the commanded quadrature-axis voltage of each load, such as the first electric machine 12 and the second electric machine 112. Further, consistent with the above proportional relationship, the target variable DC bus voltage is the greater of target variable DC bus voltage required by the first electric machine 12 or the second electric machine.

For example, in accordance with the second technique, the voltage command estimator 36 is configured to estimate the variable DC bus voltage by estimating the variable DC bus voltage in accordance with the following equations for the first electric machine 12 and for the second electric machine 112:

$V_{dc_{est(EM1)}} = \sqrt{3} * \sqrt{V^*_{d(EM1)}{}^2 + V^*_{q(EM1)}{}^2}$, where $V_{dc\_est(EM1)}$ is the minimum estimated variable DC bus voltage for the first electric motor (e.g. EM1), where $V^*_{d(EM1)}$ is the commanded direct-axis voltage by the first inverter 14, and $V^*_{q(EM1)}$ is the commanded quadrature-axis voltage by the first inverter 14.

$V_{dc_{est(EM2)}} = \sqrt{3} * \sqrt{V^*_{d(EM2)}{}^2 + V^*_{q(EM2)}{}^2}$, where $V_{dc\_est(EM2)}$ is the minimum estimated variable DC bus voltage for the second electric motor (e.g. EM2), where $V^*_{d(EM2)}$ V is the commanded direct-axis voltage by the second inverter 114, and $V^*_{q(EM2)}$ is the commanded quadrature-axis voltage by the second inverter 114.

$MaxV_{dc_{est(EM1,EM2)}}$ is the maximum or greater of $V_{dc_{est(EM1)}}$ for the first electric motor (e.g. EM1) and $V_{dc_{est(EM2)}}$ for the second electric motor (e.g., EM2). For example, and consistent with the above equations, within each inverter, the current regulator may output the commanded direct-axis voltage ($V^*_d$) and the commanded quadrature-axis voltage ($V_q$) based on an input to the current regulator of commanded d-q axis current ($I^*_{dq}$) and observed d-q axis current ($I_{dq}$).

In accordance with a third technique, the voltage command estimator 36 is configured to estimate the variable DC bus voltage, where there is some margin or range of fluctuation allowed in variable DC bus about a virtual, baseline or nominal fixed DC bus voltage. For example, the voltage command estimator 36 is configured to estimate the variable DC bus voltage in accordance with one or more of the following rule-based, conditional equations:

(1) If $V_{dc\_cmd} \leq V_{DCThresh}$, then $V_{dc\_cmd} = Max\ V_{dc\_est(EM1, EM2)} + M$, where $V_{dc\_cmd}$ is the commanded estimated variable DC bus voltage, $V_{DCThresh}$ is a fixed DC bus voltage threshold (e.g., 700 VDC), M is a margin, and $MaxV_{dc_{est(EM1,EM2)}}$ is the maximum or greater of $V_{dc_{est(EM1)}}$ for the first electric motor (e.g. EM1) and $V_{dc_{est(EM2)}}$ for the second electric motor (e.g., EM2). The determination of the margin (M) is described below in greater detail.

(2) If $V_{dc\_est}(EM1) > V_{dc\_est(EM2)}$, then use $V_{dc\_cmd} = V_{dc\_est(EM1)}$, else $V_{dc\_cmd} = V_{DCThresh}$, where $V_{dc\_est}$ (EM1) is the minimum estimated variable DC bus voltage for the first electric motor (e.g. EM1); where $V_{dc\_est}$ (EM2) is the minimum estimated variable DC bus voltage for the second electric motor (e.g. EM2), where $V_{dc\_cmd}$ is the commanded estimated variable DC bus voltage, and $V_{DCThresh}$ is a fixed DC bus voltage threshold (e.g., 700 VDC).

In accordance with a fourth technique for execution of step S708, the voltage command estimator 36 is configured to estimate the target variable DC bus voltage by determining a configurable margin (M) for the minimum required direct current bus voltage, wherein the margin (M) is determined in accordance with one or more of the following: (a) deviation or standard deviation of the fixed DC bus voltage threshold (e.g., observed historically during operation of a machine and recorded in a data storage device 22), (b) a percentage of a comparable fixed DC bus voltage threshold (e.g., 700 VDC), (c) a fixed or constant DC voltage within a range (e.g., 10-25 VDC) of a comparable fixed DC bus threshold (e.g., 700 VDC or lower), and (d) on actual or predicted DC bus fluctuation that depends on load dynamics or associated with a specific tasks or historical data collected by a machine (or its implements, its tools, and its actuators) performing such tasks and stored in a data storage device 22. In one embodiment, the bandwidth of the low pass filter is configurable, the slew rate is configuration and the margin is configurable depending on or based on the load, where load may depend upon a particular work task of the vehicle (e.g., loader) such as loading a truck of certain minimum height, stock piling, or digging. Accordingly, the configurable margin (M) of the variable DC bus is based on actual or predicted DC bus fluctuation that depends on load dynamics.

Figure 8:
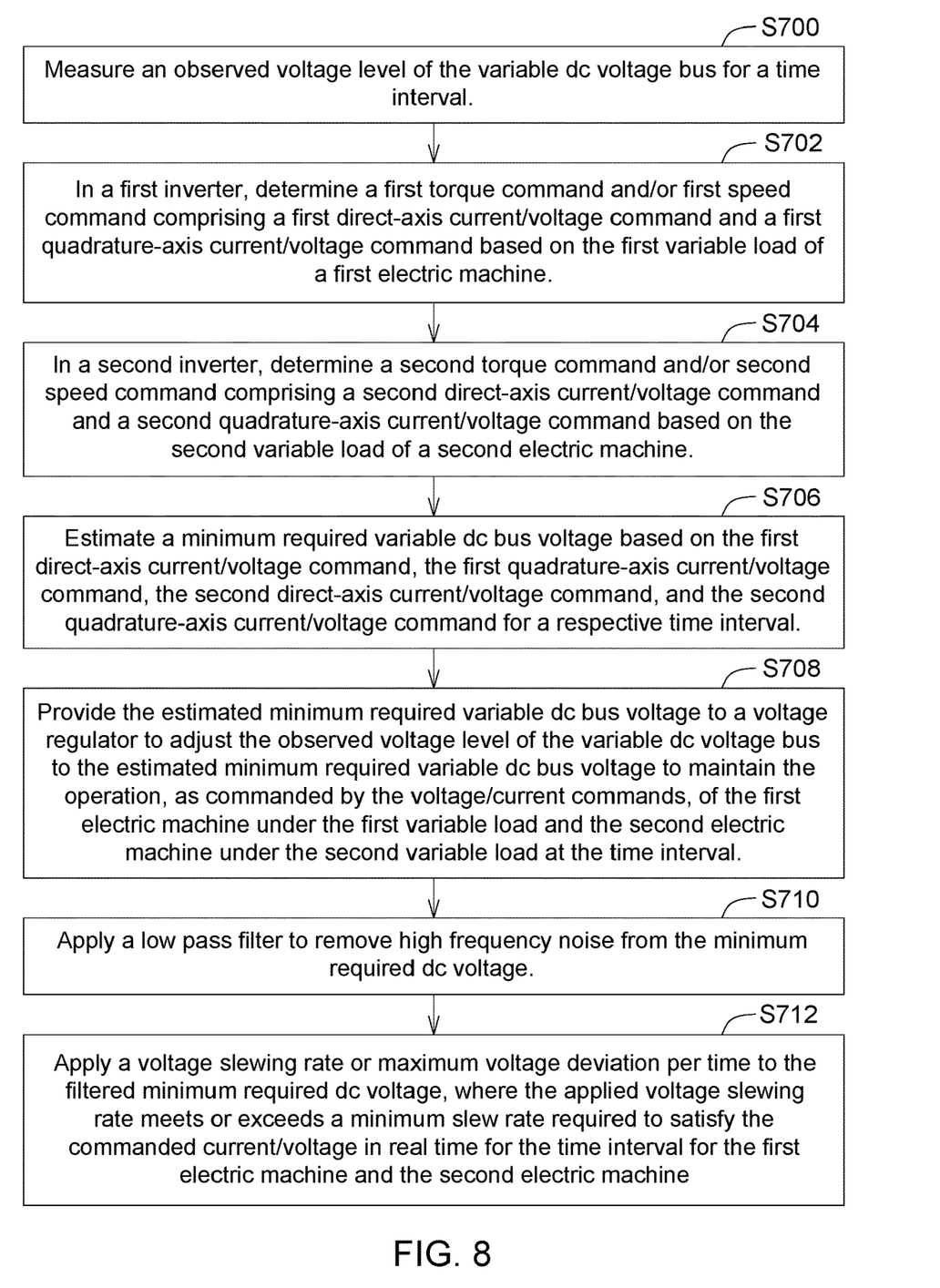
FIG. 8 is a flow chart of another embodiment of a method for providing an estimated minimum required (e.g., target) variable DC bus voltage to a regulator.

FIG. 8 is a flow chart of another embodiment of a method for providing an estimated minimum required variable DC bus voltage to a regulator. The method of FIG. 7 is similar to the method of FIG. 8, except the method of FIG. 8 further comprises step S710 and step S712. Like steps, methods, procedures or features are indicated by like reference numbers.

In step S700, a sensor 32 (e.g., voltage sensor) measures an observed voltage level of the variable direct current (DC) voltage bus at the DC bus terminals 30 for a time interval (e.g., a sampling interval). For example, the sensor 32 may have a high-impedance so as not to disturb or skew any voltage measurement samples across the DC bus terminals 30 that are taken at successive intervals.

In step S702 in a first inverter 14, a first data processor 24 determines a first torque command and/or first speed command comprising a first direct-axis current/voltage command and a first quadrature-axis current/voltage command based on the first variable load of a first electric machine 12.

In step S704 in a second inverter 114, a second data processor 124 determines a second torque command and/or second speed command comprising a second direct axis current/voltage command and a second quadrature axis current/voltage command based on the second variable load of a second electric machine 112.

In step S706, a voltage command estimator 36 is configured to estimate or estimates a minimum required variable DC bus voltage based on the first direct-axis current/voltage command, the first quadrature-axis current/voltage command, the second direct-axis current/voltage command and the second quadrature-axis current/voltage command for a respective time interval.

In step S708, the voltage command estimator 36 is configured to provide the estimated minimum required variable DC bus voltage to a voltage regulator 34 to adjust the observed voltage level of the variable DC voltage bus to the estimated minimum required variable DC bus voltage to maintain the operation, as commanded by the voltage/current commands, of the first electric machine 12 under the first variable load and the second electric machine 112 under the second variable load at the time interval.

In step S710, the voltage command estimator 36 or low pass filter 38 applies low pass filtering to remove high frequency noise form the minimum required DC bus voltage of the variable DC bus. The voltage command estimator 36 may adjust filter parameters based on the first variable load, the second variable load during any respective time interval.

Step S710 may be executed in accordance with various procedures, which may be applied separately or cumulatively. Under a first procedure, a low pass filter 38 (e.g., 10 Hz discrete filter) is applied to the estimated minimum required variable DC bus voltage to remove high frequency noise from the minimum required DC voltage (e.g., commanded variable DC voltage). Under a second procure, the low pass filter 38 has an adjustable or configurable bandwidth, attenuation, and frequency response that can be adjusted based on the first variable load, the second variable load, or both. A higher bandwidth for the low-pass filter may improve the responsiveness of command changes to change the target minimum required DC voltage of the variable DC voltage bus, with the drawback of greater high-frequency and noise content that could impact the potential reliability and potential accuracy of commanded changes to the target minimum required DC voltage.

In step S712, the voltage command estimator 36 or slew rate module 40 applies a voltage slewing rate or maximum voltage deviation per time to the filtered minimum required DC voltage, where the applied voltage slewing rate meets or exceeds a minimum slew rate required to satisfy the commanded current/voltage in real time for the time interval for the first electric machine 12 and the second electric machine 112. The minimum slew rate is dictated by the load for the particular machine and load-inducing work tasks undertaken by the machine, its implements, its actuators and its tools, where the loads require certain change in voltage per unit time to be met by the first electric machine 12 and the second electric machine 112.

Step S712 may be executed in accordance with various techniques, which may be applied separately or cumulatively. Under first technique, the slew rate module 40 configures or adjusts the slew rate and a margin associated with the minimum required DC voltage depending on or based on the first variable load, the second variable load, or both where the foregoing variable loads may depend upon a particular work task of the vehicle (e.g., loader) such as loading a truck of certain minimum height, stock piling, or digging. Under a second technique, the slew rate module 40 applies a voltage slewing rate (e.g., 2.5 V/500 microseconds or 5000 V/s) or maximum voltage deviation per time to the filtered minimum required DC voltage, where the applied voltage slewing rate meets or exceeds a minimum slew rate required to satisfy the commanded current/voltage in real time for the time interval for the first electric machine 12 and the second electric machine 112. Under a third technique, the slew rate module 40 sends the filtered, slewed variable bus voltage to the voltage regulator 34 of the variable DC bus voltage.

Although FIG. 1 and FIG. 6 illustrate applying the system and method to configurations with two machines coupled to a variable DC voltage bus, the above concepts set forth in this disclosure can be extended to multiple machines coupled to a variable DC voltage bus. For example, the multiple machine configuration requires that the respective minimum required DC bus voltage for each inverter is accessible in a timely manner (e.g., a time interval or successive time intervals) such as for a quad-inverter configuration, where four inverters are coupled in parallel to the DC bus terminals.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A method for controlling a first inverter and a second inverter that are coupled to variable DC voltage bus, in which a plurality of inverter inputs are coupled to a variable direct current (DC) voltage bus and in which a plurality of alternating current inverter outputs are connected to a first variable load and a second variable load, the method comprising:

measuring an observed voltage level of the variable DC voltage bus for a time interval;

in the first inverter, determining a first torque command and/or a first speed command comprising a first direct-axis current/voltage command and a first quadrature-axis current/voltage command demanded by real time, transient load conditions on a first electric machine to maintain operation for the time interval based on the first variable load of the first electric machine;

in the second inverter, determining a second torque command and/or a second speed command comprising a second direct-axis current/voltage command and a second quadrature-axis current/voltage command demanded by real time, transient load conditions on a second electric machine to maintain operation for the time interval based on the second variable load of the second electric machine;

estimating a minimum required variable DC bus voltage based on the first direct-axis current/voltage command, the first quadrature-axis current/voltage command, the second direct-axis current/voltage command, and the second quadrature-axis current/voltage command for a respective time interval, wherein a reserved component of the variable DC bus voltage is configured to be available to meet the first and second torque commands that are demanded by the real-time transient load conditions on the first electric machine and second electric machine associated with propulsion of a vehicle or driving one or more implements of a vehicle, wherein the estimating of the variable DC bus voltage further comprises estimating the variable DC bus voltage in accordance with the following equation:

if $V_{dc\_est(EM1)} > V_{dc\_est(EM2)}$, then use $V_{dc\_cmd} = V_{dc\_est(EM1)}$, else $V_{dc\_cmd} = V_{DCThresh}$, where $V_{dc\_est(EM1)}$ is the minimum estimated variable DC bus voltage for the first electric motor;

where $V_{dc\_est(EM2)}$ is the minimum estimated variable DC bus voltage for the second electric motor, where $V_{dc\_cmd}$ is the commanded estimated variable DC bus voltage, and $V_{DCThresh}$ is a fixed DC bus voltage threshold; and providing the estimated minimum required variable DC bus voltage to a voltage regulator to adjust the observed voltage level of the variable DC voltage bus to the estimated minimum required variable DC bus voltage to maintain the operation, as commanded by the current/voltage commands, of the first electric machine under the first variable load and the second electric machine under the second variable load at the time interval.

2. The method according to claim 1 wherein the providing of the estimated minimum required variable DC bus voltage further comprises limiting the fluctuation of the DC bus voltage to meet or exceed the demanded current and respective demanded voltage levels of the first electric machine under the first variable load and the second electric machine under the second variable load, as if the variable DC bus voltage were fixed at constant DC level above the estimated minimum required variable DC bus voltage.

3. The method according to claim 1 wherein the estimating of the variable DC bus voltage is accomplished by estimating the target variable DC bus voltage to be proportional to the square root of the sum of the squares of the commanded-direct axis voltage and the commanded quadrature-axis voltage of each load, such as the first electric machine and the second electric machine.

4. The method according to claim 3 wherein the target variable DC bus voltage is the greater of target variable DC bus voltage required by the first electric machine or the second electric machine.

5. The method according to claim 1 wherein the estimating of the variable DC bus voltage further comprises estimating the variable DC bus voltage in accordance with the following equations:

$V_{dc_{est(EM1)}} = \sqrt{3} * \sqrt{V^*_{d(EM1)}{}^2 + V^*_{q(EM1)}{}^2}$, where $V_{dc\_est(EM1)}$ is the minimum estimated variable DC bus voltage for the first electric motor, where $V^*_{d(EM1)}$ is the commanded direct-axis voltage by the first inverter, and $V^*_{q(EM1)}$ is the commanded quadrature-axis voltage by the first inverter;

$V_{dc_{est(EM2)}} = \sqrt{3} * \sqrt{V^*_{d(EM2)}{}^2 + V^*_{q(EM2)}{}^2}$, where $V_{dc\_est(EM2)}$ is the minimum estimated variable DC bus voltage for the second electric motor, where $V^*_{d(EM2)}$ is the commanded direct-axis voltage by the second inverter, and $V^*_{q(EM2)}$ is the commanded quadrature-axis voltage by the second inverter; and $MaxV_{dc_{est(EM1EM2)}}$ is the maximum or greater of $V_{dc_{est(EM1)}}$ for the first electric motor and $V_{dc_{est(EM2)}}$ for the second electric motor.

6. The method according to claim 1 wherein the estimating of the variable DC bus voltage further comprises estimating the variable DC bus voltage in accordance with the following equation:

if $V_{dc\_cmd} \leq V_{DCThresh}$, then $V_{dc\_cmd} = Max\ V_{dc\_est(EM1, EM2)} + M$, where $V_{dc\_cmd}$ is the commanded estimated variable DC bus voltage, $V_{DCThresh}$ is a fixed DC bus voltage threshold, M is a margin, and $MaxV_{dc_{est(EM1EM2)}}$ is the maximum or greater of $V_{dc_{est(EM1)}}$ for the first electric motor and $V_{dc_{est(EM2)}}$ for the second electric motor, where the margin is determined in accordance with a historic deviation or historic standard deviation of a fixed DC bus voltage threshold recorded during prior operation of the vehicle.

7. The method according to claim 1 wherein the estimating of the variable DC bus voltage further comprises:
determining a margin is determined in accordance with one or more of the following: (a) deviation or standard deviation of the fixed DC bus voltage threshold, (b) a percentage of the fixed DC bus voltage threshold, (c) a fixed or constant DC voltage within a range, and (d) on actual or predicted DC bus fluctuation that depends on load dynamics or associated with a specific tasks or historical data collected by a machine performing such tasks and stored in a data storage device, wherein the margin refers to a range of fluctuation allowed in the variable DC bus voltage about a virtual, baseline or nominal fixed DC bus voltage.

8. The method according to claim 1 further comprising:
applying a low pass filter to remove high frequency noise from the minimum required variable DC bus voltage or the commanded variable DC bus voltage.

9. The method according to claim 8 further comprising:
applying a voltage slewing rate or maximum voltage deviation per time to the filtered minimum required variable DC bus voltage, where the applied voltage slewing rate meets or exceeds a minimum slew rate required to satisfy the commanded current/voltage in real time for the time interval for the first electric machine and the second electric machine.

10. The method according to claim 9 further comprising sending the filtered, slewed variable bus voltage to the voltage regulator of the variable DC bus voltage.

11. The method according to claim 1 wherein a capacitor across the variable DC bus has a reduced maximum current capacity rating commensurate with the variable peak current value of the variable DC voltage bus that is lower than a peak current value of the fixed constant DC bus voltage.

12. The method according to claim 1 wherein a set of semiconductor switches in the first inverter and the second inverter have reduced time-averaged, operational switching losses associated with a reduction in the variable DC bus voltage from a fixed constant DC bus voltage commensurate with a peak voltage of the variable DC bus voltage.

13. The method according to claim 1 wherein a required voltage change per unit time of the variable DC bus is minimized, or a required slew rate of the estimated variable DC bus is minimized, to reduce thermal stress of the winding insulation of the first electric machine and the second electric machine.

14. The method according to claim 1 further comprising:
operating the first inverter and the second inverter with offset phases of alternating current output signals to provide interleaving that reduces the ripple current and ripple voltage of the variable DC bus.

15. A system for controlling a first inverter and a second inverter that are coupled to variable DC voltage bus, in which a plurality of inverter inputs are coupled to a variable direct current (DC) voltage bus and in which a plurality of alternating current inverter outputs are connected to a first variable load and a second variable load, the system comprising:
a sensor for measuring an observed voltage level of the variable DC voltage bus for a time interval;
the first inverter configured to determine a first torque command and/or a first speed command comprising a first direct-axis current/voltage command and a first quadrature-axis current/voltage command demanded by real time, transient load conditions on a first electric machine to maintain operation for the time interval based on the first variable load of the first electric machine;
the second inverter configured to determine a second torque command and/or a second speed command comprising a second direct-axis current/voltage command and a second quadrature-axis current/voltage command demanded by real time, transient load conditions on a second electric machine to maintain operation for the time interval based on the second variable load of the second electric machine associated with propulsion of a vehicle or driving one or more implements of a vehicle, wherein the voltage command estimator is configured to estimate the variable DC bus voltage in accordance with the following equation:

if $V_{dc\_est(EM1)} > V_{dc\_est(EM2)}$, then use $V_{dc\_cmd} = V_{dc\_est(EM1)}$, else $V_{dc\_cmd} = V_{DCThresh}$, where $V_{dc\_est(EM1)}$ is the minimum estimated variable DC bus voltage for the first electric motor;

where $V_{dc\_est(EM2)}$ is the minimum estimated variable DC bus voltage for the second electric motor, where $V_{dc\_cmd}$ is the commanded estimated variable DC bus voltage, and where $V_{DCThresh}$ is a fixed DC bus voltage threshold; and the voltage command estimator configured to provide the estimated minimum required variable DC bus voltage to a voltage regulator to adjust the observed voltage level of the variable DC voltage bus to the estimated minimum required variable DC bus voltage to maintain the operation, as commanded by the current/voltage commands, of the first electric machine under the first variable load and the second electric machine under the second variable load at the time interval.

16. The system according to claim 15 wherein:

the first inverter and the second inverter are configured to operate with offset phases of alternating current output signals to provide interleaving that reduces the ripple current and ripple voltage of the variable DC bus.

17. The system according to claim 1 wherein the required voltage change per unit time of the variable DC bus is minimized, or a required slew rate of the estimated variable DC bus is minimized, to reduce thermal stress of the winding insulation of the first electric machine and the second electric machine.

18. The system according to claim 15 wherein the voltage command estimator is configured to estimate the variable DC bus voltage in accordance with the following equations:

$V_{dc_{est(EM1)}} = \sqrt{3} * \sqrt{V^*_{d(EM1)}{}^2 + V^*_{q(EM1)}{}^2}$, where $V_{dc\_est(EM1)}$ is the minimum estimated variable DC bus voltage for the first electric motor, where $V^*_{d(EM1)}$ is the commanded direct-axis voltage by the first inverter, and $V^*_{q(EM1)}$ is the commanded quadrature-axis voltage by the first inverter;

$V_{dc_{est(EM2)}} = \sqrt{3} * \sqrt{V^*_{d(EM2)}{}^2 + V^*_{q(EM2)}{}^2}$, where $V_{dc\_est(EM2)}$ is the minimum estimated variable DC bus voltage for the second electric motor, where $V^*_{d(EM2)}$ is the commanded direct-axis voltage by the second inverter, and $V^*_{q(EM2)}$ is the commanded quadrature-axis voltage by the second inverter; and $MaxV_{dc_{est(EM1,EM2)}}$ is the maximum or greater of $V_{dc_{est(EM1)}}$ for the first electric motor and $V_{dc_{est(EM2)}}$ for the second electric motor.

19. The system according to claim 15 wherein the voltage command estimator is conjured to estimate the variable DC bus voltage in accordance with the following equation:

if $V_{dc\_cmd} \leq V_{DCThresh}$, then $V_{dc\_cmd} = MaxV_{dc\_est(EM1, EM2)} + M$, where $V_{dc\_cmd}$ is the commanded estimated variable DC bus voltage, $V_{DCThresh}$ is a fixed DC bus voltage threshold, M is a margin, and $MaxV_{dc_{est(EM1,EM2)}}$ is the maximum or greater of $V_{dc_{est(EM1)}}$ for the first electric motor and $V_{dc_{est(EM2)}}$ for the second electric motor, where the margin is determined in accordance with a historic deviation or historic standard deviation of a fixed DC bus voltage threshold recorded during prior operation of the vehicle.

* * * * *